United States Patent [19]
Ma et al.

[11] Patent Number: 5,831,795
[45] Date of Patent: Nov. 3, 1998

[54] HEAD LOADING MECHANISM FOR A DISK DRIVE

[75] Inventors: Yiping Ma, Layton; Edward L. Rich, Ogden; Fred C. Thomas, III, Kaysville; David W. Griffith, Layton, all of Utah

[73] Assignee: Iomega Corporation, Roy, Utah

[21] Appl. No.: 857,378

[22] Filed: May 16, 1997

Related U.S. Application Data

[63] Continuation of Ser. No. 579,612, Dec. 26, 1995, abandoned, which is a continuation-in-part of Ser. No. 438,254, May 10, 1995, abandoned, and Ser. No. 560,741, Nov. 20, 1995, abandoned.

[51] Int. Cl.$^6$ ............................... G11B 5/54; G11B 21/22
[52] U.S. Cl. .............................................. 360/105
[58] Field of Search ................................... 360/104, 105, 360/109

[56] References Cited

U.S. PATENT DOCUMENTS

| | | | |
|---|---|---|---|
| 4,051,735 | 10/1977 | Johnson et al. | 74/25 |
| 4,504,879 | 3/1985 | Toldi et al. | 360/105 |
| 4,644,429 | 2/1987 | Boe | 360/105 |
| 4,661,873 | 4/1987 | Schulze | 360/105 |
| 4,663,677 | 5/1987 | Griffith et al. | 360/71 |
| 4,663,686 | 5/1987 | Freeman et al. | 360/71 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,868,696 | 9/1989 | Hammer et al. | 360/106 |
| 4,901,173 | 2/1990 | Jones et al. | 360/99.04 |
| 4,933,785 | 6/1990 | Morehouse et al. | 360/78.04 |
| 4,956,733 | 9/1990 | Dalziel | 360/105 |
| 4,965,685 | 10/1990 | Thompson et al. | 360/97.01 |
| 5,023,737 | 6/1991 | Yeager | 360/105 |
| 5,027,241 | 6/1991 | Hatch et al. | 360/105 |
| 5,079,652 | 1/1992 | Ishida et al. | 360/75 |
| 5,148,339 | 9/1992 | Yoshida | 360/105 |
| 5,204,793 | 4/1993 | Polnczak | 360/97.01 |
| 5,237,477 | 8/1993 | Hodapp et al. | 360/128 |
| 5,267,227 | 11/1993 | Nanke | 369/77.1 |
| 5,274,519 | 12/1993 | Saito et al. | 360/105 |
| 5,283,705 | 2/1994 | Iwabuchi | 360/105 |
| 5,285,338 | 2/1994 | Sugahara et al. | 360/105 |
| 5,317,464 | 5/1994 | Witt et al. | 360/99.08 |
| 5,347,414 | 9/1994 | Kano | 360/105 |
| 5,504,641 | 4/1996 | Diel | 360/106 |

FOREIGN PATENT DOCUMENTS

| | | |
|---|---|---|
| 6-76509 | 3/1994 | Japan . |
| WO 93/18507 | 9/1993 | WIPO . |

OTHER PUBLICATIONS

Godwin, J., "An Introduction to the Insite 325 Floptical® Disk Drive", presented at SPIE Optical Data Storage Topical Meeting, 1989.

*Primary Examiner*—Stuarts S. Levy
*Assistant Examiner*—William J. Klimowicz
*Attorney, Agent, or Firm*—Woodcock Washburn Kurtz Mackiewicz & Norris LLP

[57] ABSTRACT

A head loading mechanism for a removable cartridge disk drive comprises a support base fixedly mounted in the drive, and a moveable member movably attached to the support base via a pair of elongate flexures. The moveable member has a ramped surface adapted to engage a suspension arm at the distal end of an actuator. A read/write head is mounted on the suspension arm. The moveable member moves upon the flexures in tandem with the actuator as it moves toward and away from the edge of a disk inserted in the drive. The moveable member carries the suspension arm of the actuator to the edge of the disk, at which point the suspension arm can ride up and down the ramped surface of the moveable member in order to load the read/write head onto the surface of the disk and then subsequently to unload the read/write head from the disk.

42 Claims, 7 Drawing Sheets ns. No. 08/579,612,
HEAD LOADING MECHANISM FOR A DISK DRIVE

RELATED APPLICATIONS

This is a continuation of application Ser. No. 08/579,612, filed Dec. 26, 1995, now abandoned, which is a continuation-in-part of Ser. No. 08/560,741 filed Nov. 20, 1995, now abandoned, and of Ser. No. 08/438,254 filed May 10, 1995, now abandoned.

BACKGROUND

1. Field of the Invention

The present invention relates to a disk drive of the type that receives a removable disk cartridge and employs an actuator for moving a read/write head over the recording surface of a disk. More particularly, the present invention relates to a head loading mechanism for loading the read/write head onto the surface of the disk and for unloading the read/write head from the disk.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk. Some cartridges contain multiple disks attached in stacked relation to a common hub.

Disk drives for use with such removable disk cartridges typically employ either a linear actuator mechanism or a radial arm actuator mechanism for positioning the read/write head(s) of the disk drive on the recording surface(s) of the disk. Because the disk cartridges are designed to be removable from the drive, the linear or radial arm actuators must be able to move off, and away from, the recording disk to a retracted position in order to prevent damage to the head(s) when a cartridge is inserted and removed from the disk drive.

Many removable cartridge disk drives employ a pair of opposing read/write heads for recording and reproducing information on both sides of the disk within a removable cartridge. Typically, the opposing heads are disposed on flexible suspension arms at the distal end of the actuator arm that allow the heads to fly closely over the respective surfaces of the rotating disk. The opposing heads must be spread apart as they approach the edge of the disk during a head loading operation in order to avoid collision with the edge of the disk. Similarly, when the heads are unloaded from the disk, they must again be spread apart to avoid collision with the edge of disk and each other.

A mechanism for controlling the loading and unloading of heads in connection with a linear actuator mechanism is disclosed in commonly assigned, copending patent application Ser. No. 08/324,895, filed Oct. 18, 1994, entitled "Head Load/Unload and Cleaning in a Data Storage Device". As disclosed therein, wings are attached to the heads that act as lifters to control the vertical position of the heads. The wings are in close proximity to the heads to fully ensure that the motion of the wing is the motion of the heads. The wings ride on opposed ramps fixedly disposed in the drive as the carriage of the linear actuator moves toward and away from the disk. As the heads move toward the disk, first opposed ramps separate the heads so that the heads can pass on both sides of the disk. Further travel of the actuator causes the wings to ride down second opposed ramps which bring the heads together onto the disk in a controlled manner. As the linear actuator is withdrawn away from the disk, the wings ride up the second opposed ramps to again separate the heads. Further retraction of the linear actuator moves the heads away from the disk and down the first opposed ramps. This brings the heads together onto a cleaning medium well out of the way of the disk cartridge. In this retracted position, disk cartridges can be inserted and removed from the disk drive without harming the read/write heads.

U.S. Pat. No. 4,965,685 (Thompson et al.) discloses a head loading mechanism for use with a radial arm voice coil actuator. The radial arm actuator comprises a bifurcated actuator arm that, has upper and lower suspension arms mounted at its distal end. Magnetic heads are mounted on the ends of the respective suspension arms. The actuator arm is pivotally mounted to the drive chassis via a spindle assembly and pivots about the axis of the spindle assembly in order to move the magnetic heads along an approximate radius of the disk. The actual motion is, of course, arcuate. A voice coil motor controls the motion of the actuator arm.

The head loading mechanism of Thompson et al. comprises a base plate that has two stops and a pivot axis. An elongate head load arm is pivotally mounted at one end to the pivot axis of the base plate. A rotary spring attached to the head load arm at the pivot axis urges the arm toward the cartridge insertion opening in the drive. Ramped prongs are formed at the distal end of the head load arm.

When the disk drive is not in use, the actuator arm is in a retracted position. In this position, the suspension arms are separated by, and rest upon, the ramped prongs of the head load arms. When a disk cartridge is inserted into the disk drive, the actuator arm is released from its retracted position and begins to move toward the disk cartridge. The action of the rotary spring causes the head load arm to move with, or follow, the actuator arm. Because the actuator arm and head load arm move together, the suspension arms at the end of the actuator arm remain separated by the ramped prongs of the head load arm.

When the suspension arms reach the edge of the disk, and the magnetic heads begin to move over the respective surfaces of the disk, the head load arm contacts one of the stops on the base plate and stops moving. The actuator arm, however, continues to move onto the disk. As a result of the continued movement of the actuator arm, the suspension arms at the end of the actuator arm slide down the now stationary ramped prongs of the head load arm, and the magnetic heads are therefore loaded onto the disk. Because the disk is spinning rapidly, the magnetic heads will fly closely over the respective surfaces of the disk.

When the disk cartridge is to be removed from the disk drive, the actuator arm begins to move back to its retracted position. As the magnetic heads approach the edge of the disk, the suspension arms engage and move back up the ramped prongs causing the suspension arms to separate and therefore to lift the magnetic heads away from the respective surfaces of the disk. When the suspension arms reach the top of the ramped prongs, the actuator arm begins to push the head load arm back to the retracted position.

Unfortunately, the head loading mechanism of Thompson et al. suffers from a number of disadvantages. First, the mechanism is relatively complex and consists of a number of separate components, i.e., the head load arm, the base plate with its pivot axis and the rotary spring. These components must be assembled during manufacture of the disk drive. This increases the cost of the drive and slows production. Secondly, there will be a certain amount of play in the head load arm resulting from the tolerances of, and clearances between, the pivot axis and the cylindrical bore of the head load arm. This play can increase over time as the cylindrical bore of the head load arm wears on the pivot axis during rotation. Excessive play in the head load arm can interfere with the proper loading and unloading of the magnetic heads.

As the foregoing illustrates, there is a need for an improved head loading mechanism for use with either radial arm actuators or linear actuators that overcomes the disadvantages of the head loading mechanism of Thompson et al. and improves upon other prior art head loading mechanisms. The present invention satisfies this need.

SUMMARY OF THE INVENTION

The present invention is directed to a head loading mechanism for a removable cartridge disk drive. The head loading mechanism of the present invention comprises a support base fixedly mounted in the drive, and a moveable member movably attached to the support base via a pair of elongate flexures. The moveable member has a ramped surface adapted to engage a suspension arm at the distal end of an actuator. A read/write head is mounted on the suspension arm. The moveable member moves upon the flexures in tandem with the actuator arm as it moves toward and away from the edge of a disk inserted in the drive. The moveable member carries the suspension arm of the actuator to the edge of the disk, at which point the suspension arm can ride up and down the ramped surface of the moveable member in order to load the read/write head onto the surface of the disk and then subsequently to unload the read/write head from the disk.

Each of the flexures is joined at one end to the moveable member and, at the other end, to the support base. The flexures are preferably spaced apart and extend substantially parallel to each other. In a preferred embodiment, each flexure comprises a substantially thin, elongate planar member, and the planar surface of each flexure lies substantially perpendicular to the direction of movement of the distal end of the actuator arm. As a result, the flexures are compliant in the direction of movement of the actuator arm, allowing the moveable member to move back and forth on the flexures in that direction, but are stiff and positionally stable in the direction perpendicular to the direction of movement of the actuator arm. The flexures impart a complex translational motion to the moveable member that closely approximates a linear motion.

Preferably, the flexures are metallic, and the support base and moveable member are formed of plastic. In the present embodiment, the metallic flexures are insert molded with the support base and moveable member to form a single, integral part.

The moveable member may have a detent positioned adjacent the ramped surface for temporarily capturing the suspension arm of the actuator and holding it in place on the moveable member as the moveable member and actuator arm move in tandem toward, and away from, the edge of the disk. The head loading mechanism of the present invention may further comprise means for stopping the movement of the moveable member toward the edge of the disk at a predetermined position proximate the disk so that the suspension arm of the actuator can move off the ramped surface of the moveable member as the actuator arm continues to move toward the disk, thereby loading the read/write head onto the surface of the disk. Preferably, the head loading mechanism further comprises means for adjusting a vertical position of the moveable member, and hence, the ramped surface thereof.

In a preferred embodiment, the actuator has at least one pair of opposing suspension arms at its distal end that each carry a read/write head for reading and recording information on opposite sides of the disk. The moveable member has a corresponding pair of ramped surfaces for receiving the respective suspension arms in order load and unload the read/write heads onto the respective surfaces of the disk. The moveable member can be adapted to accommodate any number of pairs of opposing read/write heads.

Further, in accordance with the invention, an impact absorbing pad is placed on the movable member to absorb energy when the arm impacts the movable member. In the event the magnetic head arm slams into the load ramp, the impact absorber reduces the energy transfer to the load ramp. A viscoelastic dampener is attached to the load ramp base, to one flexure, and to the movable member. The viscoelastic dampener quickly damps out any vibration which might be caused by the head slam. This prevents the heads from bouncing back onto the disk surface thereby causing damage.

The viscoelastic dampener quickly damps out any vibration in the load ramp assembly hence reducing fatigue stressing of the flexure to which the magnetic head is attached as well as possible head crashes due to uncontrolled motion of the head/flexure while unloading the heads. The return rate of the viscoelastic dampener is slow enough that it provides the load ramp flexure with a dashpot type response. This significantly slowed return rate of the ramp flexure springs inhibits the heads from being propelled back on to the disk in an uncontrolled manner and thereby causing head damage.

These and other features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1A:
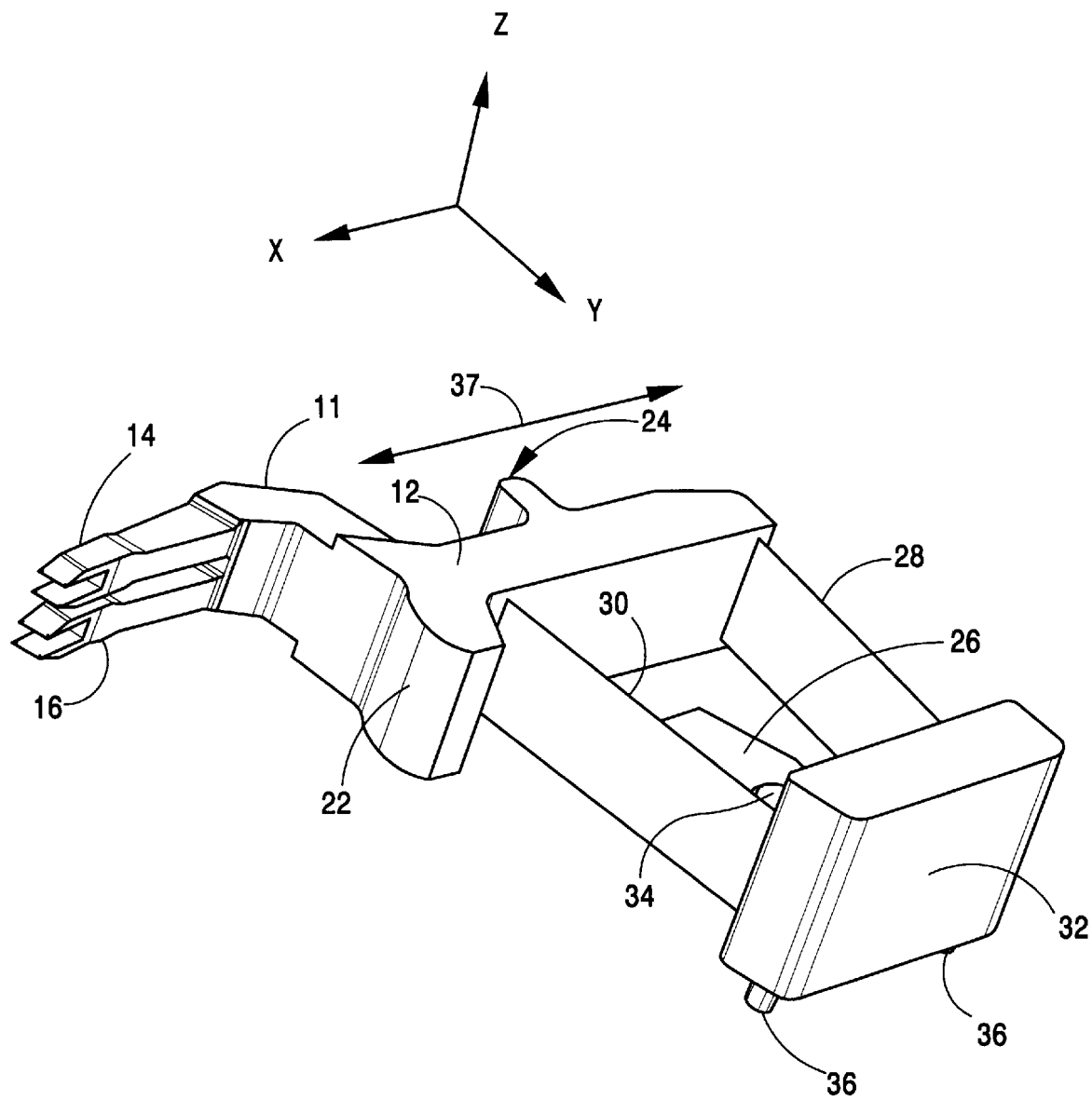
FIG. 1A is a perspective view of a head loading mechanism in accordance with a preferred embodiment of the present invention.
Figure 1B:
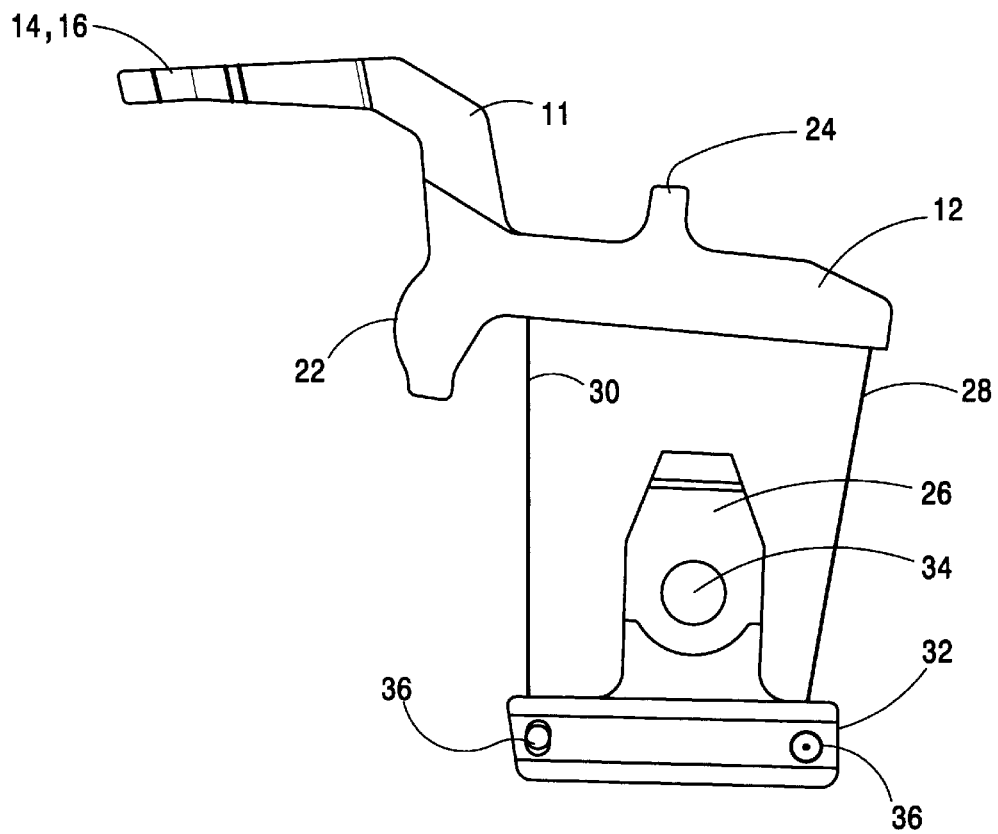
FIG. 1B is a top view of the head loading mechanism of FIG. 1A.
Figure 1C:
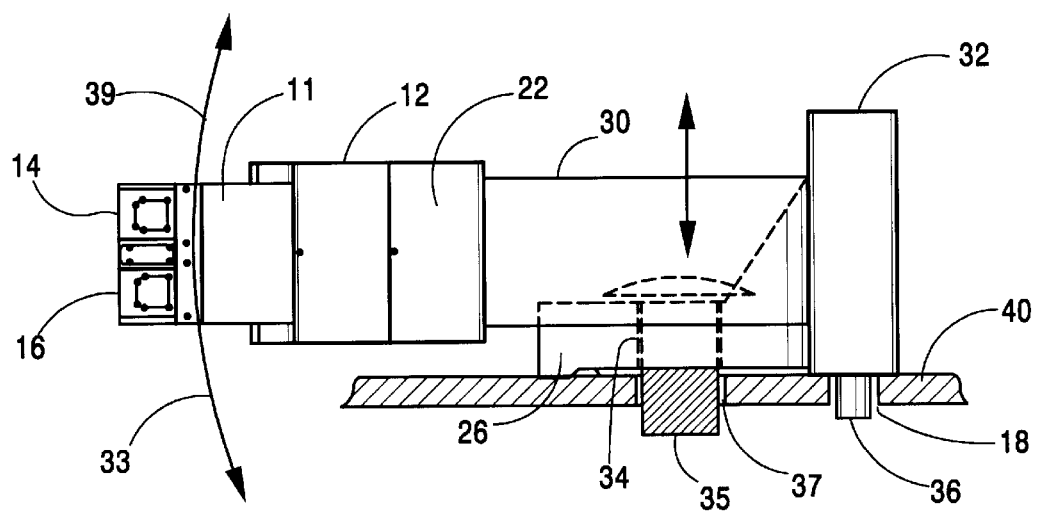
FIG. 1C is a side view of the head loading mechanism of FIG. 1A.

Referring to the drawings wherein like numerals indicate like elements throughout, there is shown in FIGS. 1A–C a preferred embodiment of a head loading mechanism 10 for use in a removable cartridge disk drive of the type that employs a moveable actuator to position one or more magnetic heads over successive tracks of one or more recording disks. In the embodiment described hereinafter, the head loading mechanism 10 is adapted for use with a radial arm actuator. It is understood, however, that the present invention is by no means limited thereto. For example, the head loading mechanism 10 of the present invention can be used with a linear actuator, if desired.

According to the present invention, the head loading mechanism 10 comprises a stationary support base 32 that is fixedly mounted in the disk drive (not shown), and a moveable member 12 movably attached to the support base 32 via a pair of elongate flexures 28, 30. In the present embodiment, the head loading mechanism 10 is adapted for use in a disk drive that accepts removable disk cartridges having two storage disks fixed to a single hub in stacked relation, however, the present invention is by no means limited thereto.

As best shown in FIGS. 1B and 1C, the support base 32 has a bridge 26 with a mounting hole 34 extending therethrough for mounting the support base 32 to a plate 40 within the disk drive. As shown in FIG. 1C, in the preferred embodiment, the support base 32 is mounted on the plate 40 with a screw 35 that is inserted through the mounting hole 34 and engages a threaded hole 37 in the plate 40. Two dowels, e.g., 36, on the bottom surface of the support base 32 engage mating apertures, e.g., 18, in the plate 40 in order to locate the support base 32 and to prevent it from moving. As described hereinafter, the bridge 26 imparts an adjustability feature to the head loading mechanism.

The moveable member 12 comprises a generally L-shaped member 11 having first and second head load arms 14, 16 formed at the distal end thereof. Each of the head load arms has a respective pair of ramped surfaces adapted to engage a respective pair of opposing suspension arms of a radial arm voice coil actuator, as described hereinafter.

As further shown, the moveable member 12 has an engagement surface 22 that engages with a corresponding engagement surface on the radial arm voice coil actuator in order to push the moveable member 12 back toward a retracted position against the inherent spring force of the flexures 28, 30. A positioning stop boss 24 is formed on the moveable member 12. A corresponding stop (not shown) positioned within the disk drive engages the positioning stop boss 24 in order to limit the travel of the moveable member 12.

Figure 2:
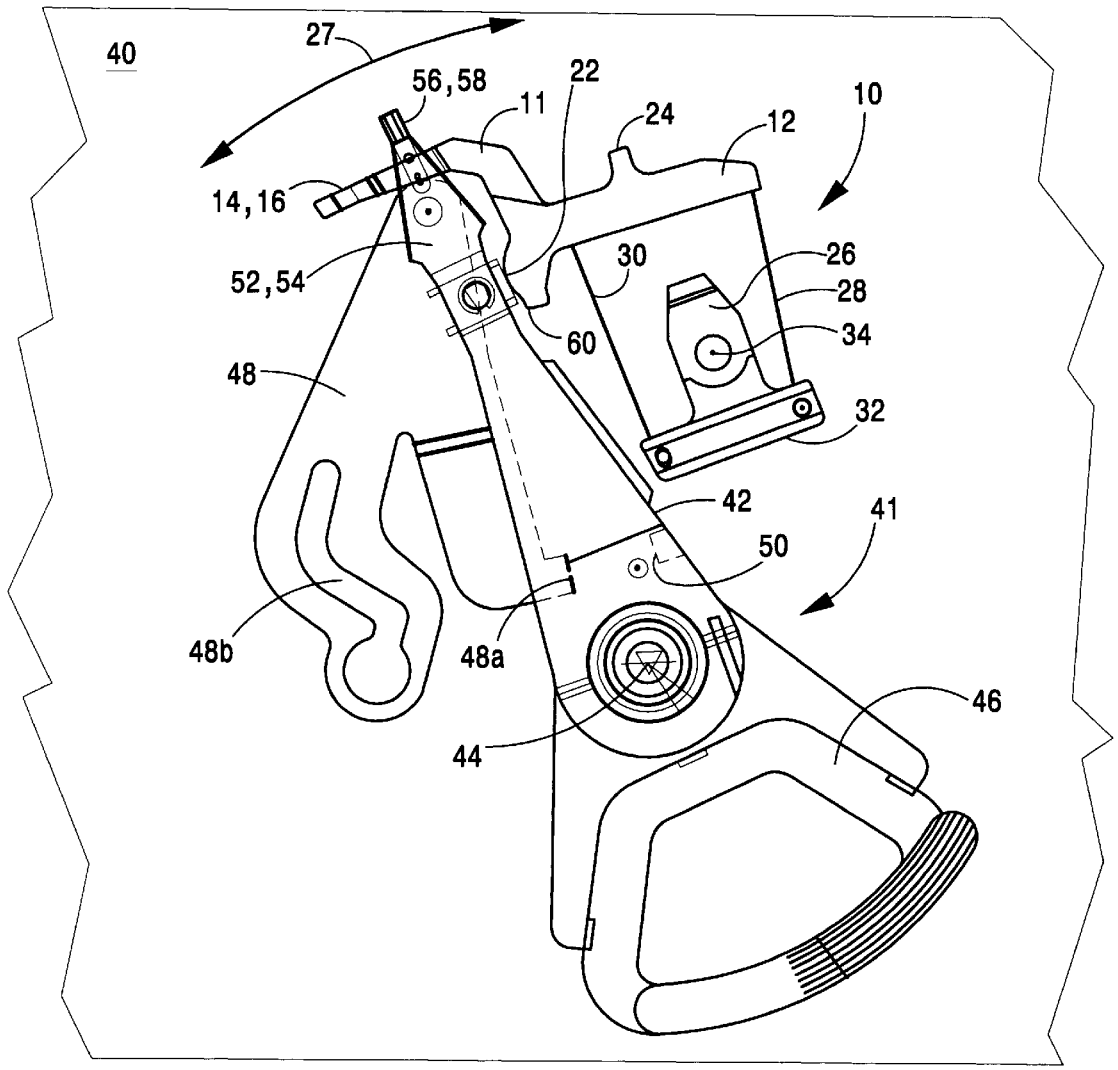
FIG. 2 is a cut-away top view of a disk drive illustrating the positioning of the head loading mechanism of FIGS. 1A–C in relation to a radial arm voice coil actuator.

FIG. 2 is a cut-away top view of a disk drive illustrating the position of the head loading mechanism 10 of the present invention in relation to a radial arm voice coil actuator 41 of the disk drive. The radial arm voice coil actuator 41 comprises an actuator arm 42 that is pivotally mounted to a rigid plate 40 within the disk drive via pivot axis 44. A voice coil motor 46 controls the rotary motion of the actuator arm 42. As described hereinafter in greater detail, first and second pairs of suspension arms 52, 54 are mounted at the distal end of the actuator arm 42. Each pair of suspension arms 52, 54 carries a respective pair of magnetic read/write heads 56, 58. As the actuator arm 42 pivots about its axis 44, the respective pairs of read/write heads 56, 58 move in the direction indicated by arrow 27.

A head park lever 48 pivotally, mounted to the plate 40 prevents movement of the actuator arm 42 when the actuator arm 42 is in a retracted, or "parked" position. In particular, a projection 48a on the head park lever 48 swings into abutment with a mating projection 50 on the actuator arm 42 to prevent counter-clockwise rotation of the actuator arm 42. The head park lever 48 locks the actuator arm 42 in place when the disk drive is not being used, i.e., when a disk cartridge is not present in the drive. When a disk cartridge is inserted into the drive, however, the head park lever 48 swings away from the projection 50 on the actuator arm 42, i.e., to the position shown in FIG. 2, thereby releasing the actuator arm 42.

As best illustrated in FIGS. 1B and 2, each of the flexures 28, 30 is joined at one end to the moveable member 12 and, at the other end, to the support base 32. The flexures 28, 30 are spaced apart and extend substantially parallel to each other. Each flexure 28, 30 comprises a substantially thin, elongate planar member. The planar surface of each flexure 28, 30 lies substantially perpendicular to the direction of movement of the distal end of the actuator arm 42, i.e., the direction indicated by arrow 27. As a result, the flexures are compliant in the direction of movement of the actuator arm 42, allowing the moveable member 12 to move back and forth on the flexures in that direction, but are stiff and positionally stable in the direction perpendicular to the direction of movement of the actuator arm, i.e., the z-axis.

In the preferred embodiment, the flexures 28, 30 are metallic, e.g., stainless steel, and the support base 32 and moveable member 12 are formed of a plastic, such as polyphenylene sulphide with a glass fill (30%), or polycarbonate with an aramid fiber fill (15%). Preferably, the metallic flexures 28, 30 are insert molded with the plastic support base 32 and moveable member 12 to form a single, integral part. This eliminates play between the moveable member 12 and support base 32. In the present embodiment, the flexures are approximately 0.003 inches thick and have a width of approximately 6.0 millimeters. The length of each flexure extending between the support base 32 and moveable member 12 is approximately 18.0 millimeters. Approximately 2.0 millimeters of each end of each flexure is embedded in the plastic of the respective moveable member 12 or support base 32 during the insertion molding process.

An engagement surface 60 at the distal end of the actuator arm 42 engages with the engagement surface 22 of the moveable member during clock-wise rotation of the actuator arm 42 in order to push the moveable member 12 back toward a retracted position against the inherent spring force of the flexures 28, 30.

Figure 3:
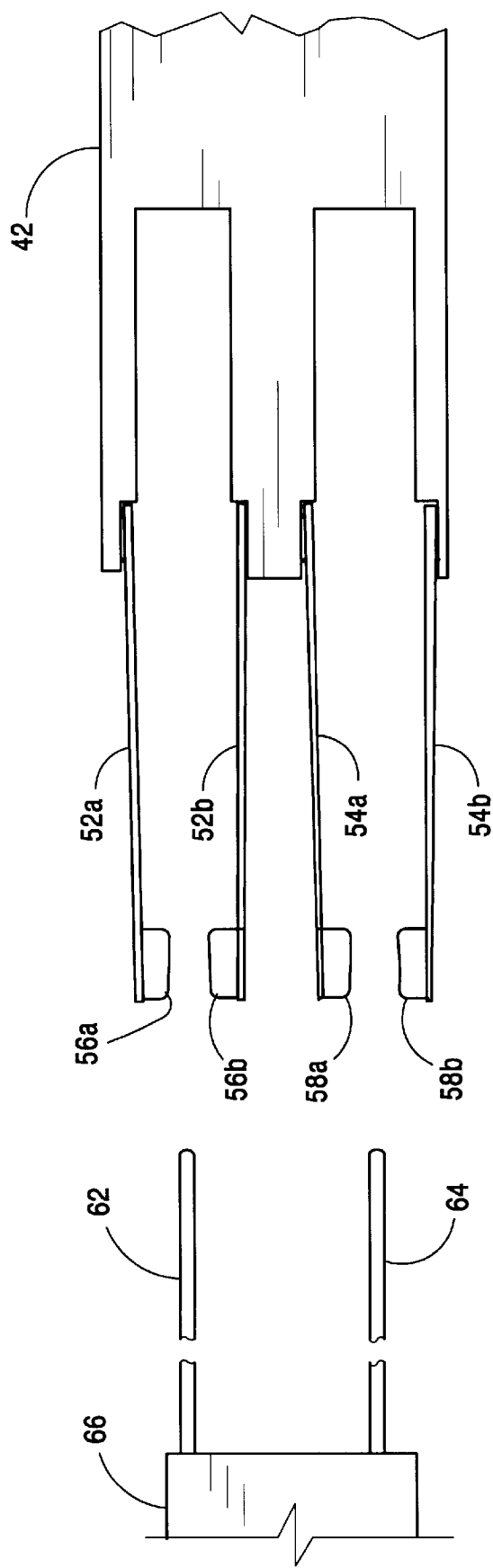
FIG. 3 is a side view of the distal end of the radial arm voice coil actuator of FIG. 2.

FIG. 3 is a side view of the distal end of the radial arm voice coil actuator 41 of FIG. 2 showing further details of the first and second pairs of suspension arms 52, 54 and corresponding pairs of opposing read/write heads 56, 58. As shown, a first pair of suspension arms 52a, 52b are mounted at the distal end of the actuator arm 42. A corresponding pair of read/write heads 56a, 56b are mounted on the respective suspension arms 52a, 52b in opposing relation. The suspension arms 52a, 52b are biased toward each other. Similarly, a second pair of suspension arms 54a, 54b are mounted at the distal end of the actuator arm 42. A corresponding pair of read/write heads 58a, 58b are mounted on the respective suspension arms 54a, 54b also in opposing relation. Like the first pair of suspension arms 52, the second pair of suspension arms 54a, 54b are mounted such that they are biased toward each other.

The first pair of suspension arms 52a–b are designed to carry the opposing read/write heads 56a–b over the respective surfaces of a first disk 62 mounted on a rotating hub 66 within a removable disk cartridge. The second pair of suspension arms 54a–b carry the opposing read/write heads 58a–b over the respective surfaces of a second disk 64 mounted on the rotating hub 66.

Figure 4:
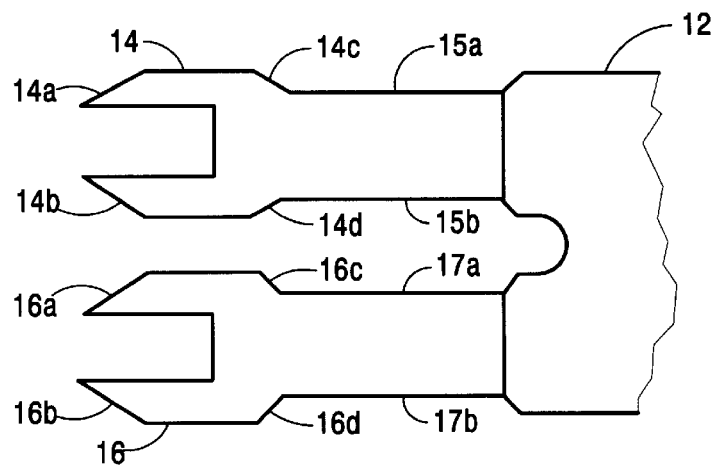
FIG. 4 is an end view of a portion of the head loading mechanism of FIGS. 1A–C.

FIG. 4 is an end view of the L-shaped member 11 of the moveable member 12 showing further details of the first and second head load arms 14, 16. As shown, each head load arm 14, 16 has a respective pair of ramped surfaces 14a, 14b, 4b, 16a, 16b formed at its distal end. The ramped surface 14a of the first head load arm 14 is adapted to engage suspension arm 52a of the radial arm actuator 41, while the other ramped surface 14b is adapted to engage suspension arm 52b. Similarly, the ramped surface 16a of the second head load arm 16 is adapted to engage suspension arm 54a of the actuator arm 42, while the other ramped surface 16b is adapted to engage the other suspension arm 54b.

As described hereinafter in greater detail, during a head unloading operation, the actuator arm 42 rotates clockwise (in FIG. 2) so that respective pairs of suspension arms 52a–b, 54a–b move toward the outer radius of their respective disks 62, 64. As the suspension arms 52a–b, 54a–b begin to move off the edge of the disk, they engage the respective ramped surfaces 14a–b, 16a–b of the first and second head load arms 14, 16. As the suspension arms 52a–b. 54a–b continue to move up the respective ramped surfaces 14a–b, 16a–b, the opposing suspension arms 52a–b, 54a–b of each pair 52, 54 are spread apart causing the respective read/write heads 56a–b, 58a–b to move vertically away from the respective surfaces of the first and second disks 62, 64. Once each suspension arm 52a, 52b, 54a, 54b reaches the top of its respective ramped surface 14a, 14b, 16a, 16b, it will slide across a substantially flat portion of the respective head load arm 14, 16 and will then slide down respective surfaces 14c, 14d, 16c, 16d into respective detents 15a, 15b, 17a, 17b formed on each head load arm 14, 16. The detents 15a, 15b, 17a, 17b temporarily capture the respective suspension arms 52a, 52b, 54a, 54b and hold the suspension arms in place on the moveable member 12.

Figure 4A:
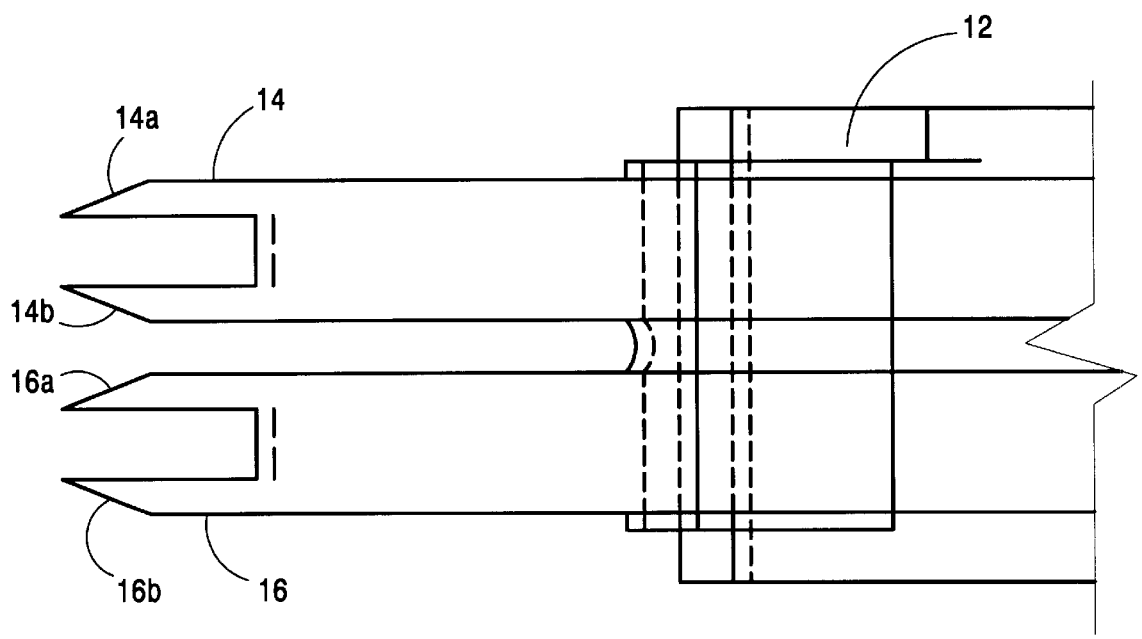
FIG. 4A is similar to FIG. 4A but without detents.

The detents 15a, 15b, 17a and 17b hold the arms and prevent damage during rough handling. However, we have found that in the preferred embodiment, there is enough friction and natural dampening to hold the arms in place without the detents. FIG. 4A shows an embodiment in which L-shaped member 11 does not have detents. Vertical positioning of the upper and lower head load arms 14, 16 relative to the suspension arms 52a–b, 54a–b and disk edges is critical. According to an important feature of the head loading mechanism of the present invention, as best illustrated in FIG. 1C, the vertical, or z-axis, positioning of the head load arms 14, 16 is adjustable. Specifically, the vertical position of the head load arms can be adjusted by loosening or tightening the mounting screw 35. As the mounting screw is tightened, the bridge 26 on the support base flexes, causing the moveable member 12 to pivot vertically with respect to the support base 32 as indicated by arrow 39. Loosening the mounting screw 35 moves the moveable member 12 in the opposite direction indicated by arrow 33. In this manner, the vertical, or z-axis, positioning of the head load arms 14, 16 can be adjusted to ensure proper critical spacing between the head load arms 14, 16, the suspension arms 52a–b, 54a–b and the edges of the disks 62, 64.

Figure 5A:
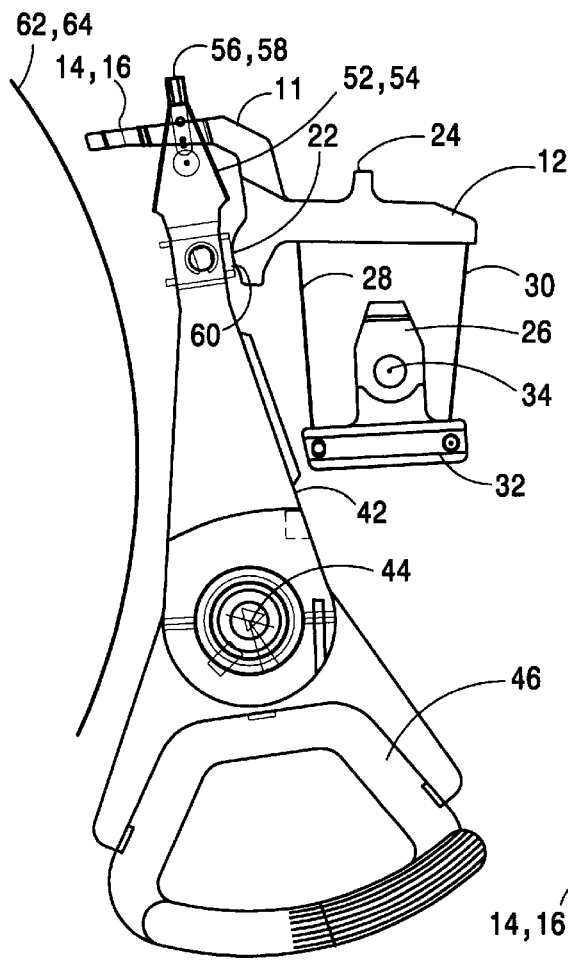
FIGS. 5A–C illustrate the operation of the head loading mechanism of the present invention.
Figure 5B:
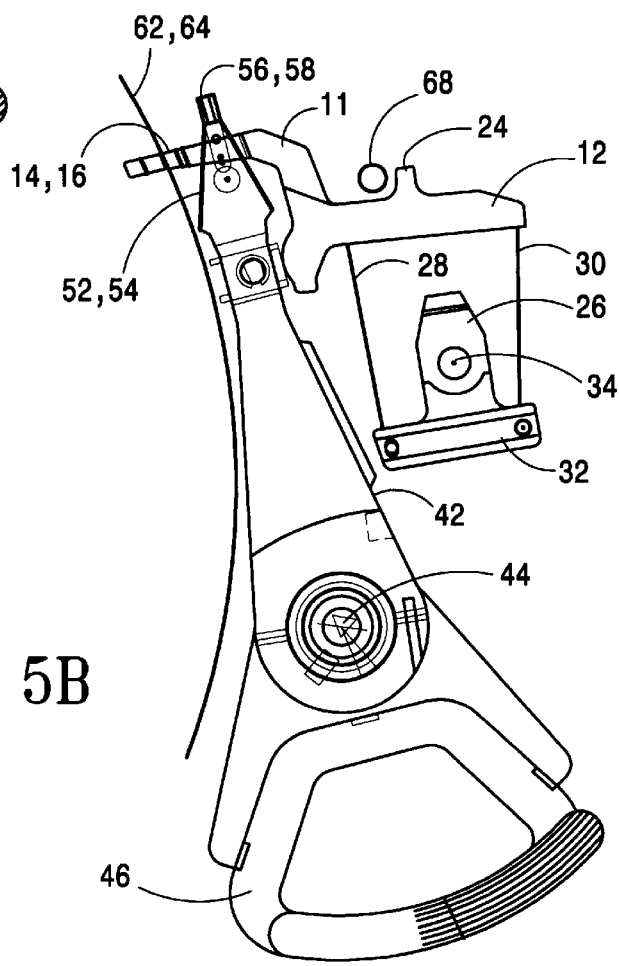
Figure 5C:
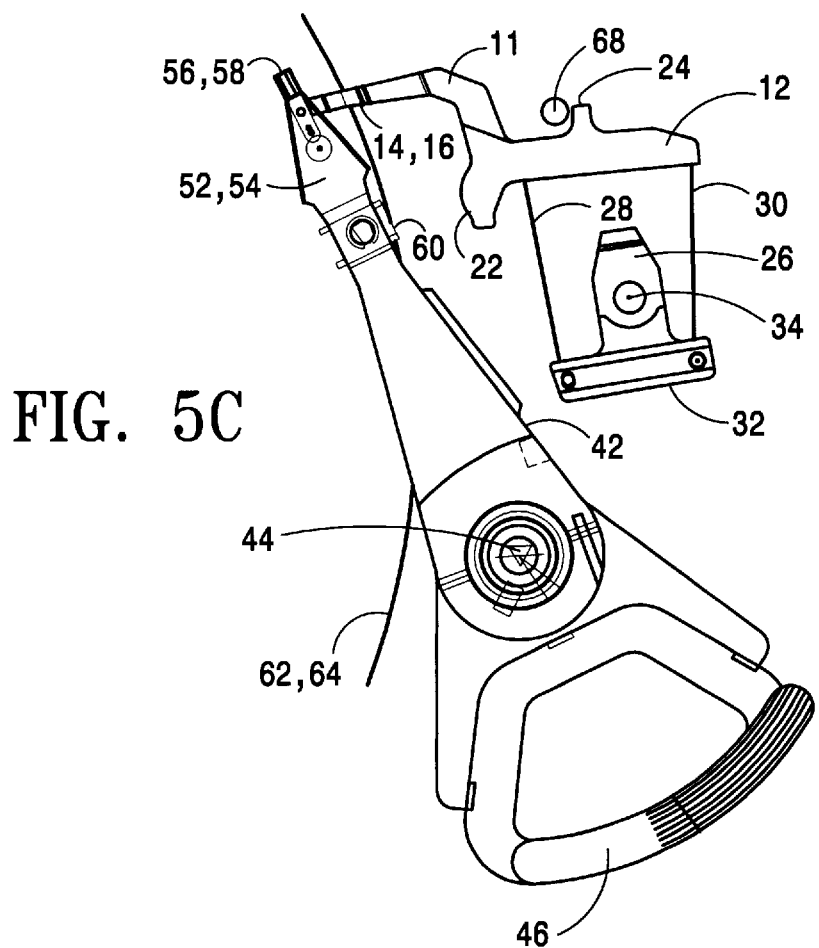

FIGS. 5A–5C illustrate the operation of the head loading mechanism 10 of the present invention. For convenience of illustration only, the head park lever 48 of FIG. 2 is not shown in FIGS. 5A–5C. FIG. 5A illustrates a retracted position of the radial arm actuator 41 and moveable member 12 when the disk drive is not in use, i.e., no cartridge is inserted in the drive. The actuator arm 42 is pushed back into this retracted position by the head park lever 48 (FIG. 2) during cartridge ejection. The actuator arm 42, in turn, pushes the moveable member 12 into this position, against the inherent spring forces of the flexures 28, 30. Each pair of suspension arms 52a–b, 54a–b rests in the respective detents 15a–b, 17a–b of the first and second head load arms 14, 16 of the moveable member 12. The head park lever 48 locks the actuator arm 42 in this retracted position until it is again necessary to load the respective pairs of heads 56a–b, 58a–b onto the disks 62, 64 of a disk cartridge inserted in the disk drive.

Referring now to FIG. 5B, when a disk cartridge (not shown) is fully inserted in the disk drive, and the first and second disks 62, 64 within the cartridge have reached their operating positions, the head park lever 48 (FIG. 2) will disengage from the actuator arm 42 allowing the actuator arm 42 to rotate counter-clockwise toward the edges of the disks 62, 64. As the suspension arms 52a–b, 54a–b move toward the edges of the respective disks 62, 64, the inherent spring force of the flexures 28, 30 causes the moveable member 12 to follow the actuator arm 42 toward the disks. During this movement, the suspension arms 56a–b, 58a–b remain captured in the detents 15a–b, 17a–b on the respective head load arms 14, 16.

Referring now to FIG. 5C, as the ramped surfaces 14a–b, 16a–b of the head load arms 14, 16 move just past the edges of the respective disks 62, 64, the positioning boss 24 on the moveable member 12 contacts a stop 68 fixedly mounted within the drive, and the moveable member 12 therefore stops moving. The actuator arm 42, however, continues to move. As a result, the suspension arms 52a–b, 54a–b at the distal end of the actuator arm 42 move out of the detents 15a–b, 17a–b on the now stationary moveable member 12 and down the respective ramped surfaces 14a–b, 16a–b, thereby loading each pair of opposing heads 56a–b, 58a–b onto the opposite surfaces of each disk 62, 64. As recited in the appended claims, the positioning boss 24 and stop 68 comprise a means for stopping the movement of the moveable member 12 toward the edge of the disks 62, 64.

Because the disks are spinning at a relatively high velocity, the magnetic heads 56a–b, 58a–b will fly closely over the respective surfaces of the disks 62, 64 as the actuator arm 42 moves the heads 56a–b, 58a–b from track-to-track along an approximate radius of each disk 62, 64.

When the disk cartridge is to be removed, the head arm 52 rotates clockwise toward the outer radius of each disk 62, 64, causing the suspension arms 52a–b, 54a–b to ride back up the respective ramped surfaces 14a–b, 16a–b and into the respective detents 15a–b, 17a–b on the respective head load arms 14, 16. As the suspension arms 52a–b, 54a–b move up the respective ramped surfaces 14a–b, 16a–b, the magnetic heads are lifted away from the respective surfaces of each disk 62, 64. The flexures 28, 30 are sufficiently pre-loaded to keep the moveable member 12 stationary until the suspension arms 52a–b, 54a–b reach their respective detents 15a–b, 17a–b. The head park lever 48 then begins to push the actuator arm 42 further, back toward the retracted position. As the actuator arm 42 continues to move, the engagement surface 60 on the actuator arm 42 engages the mating surface 20 on the moveable member 12, and the actuator arm 42 begins to push the moveable member 12 with it, back to the retracted position shown in FIG. 5A.

Figure 6:
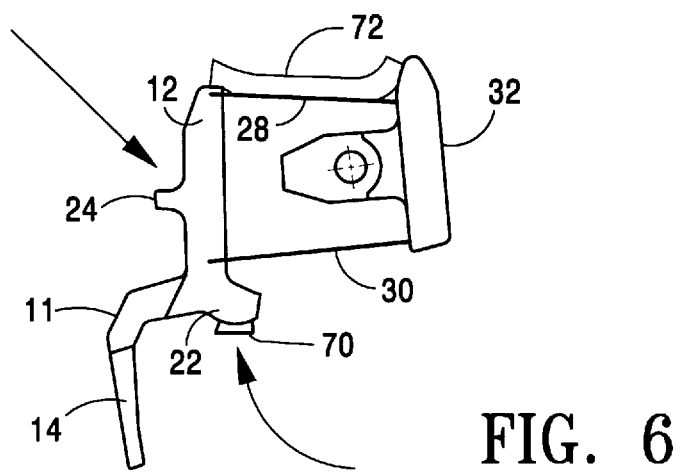
FIG. 6 shows the impact absorber and the viscoelastic dampener of the present invention.

FIG. 6 shows an embodiment wherein like reference numerals are used to denote like parts in the previous drawings. In this embodiment, an impact absorber 70 is positioned on the engagement surface 22 of the movable member 12. The impact absorber 70 absorbs energy when the suspension arms 52, 54 (FIG. 2) impact the movable member at the engagement surface 22. The impact absorber 70 reduces the energy transferred to the movable member 12 if the actuator arm slams into the load ramps. In the preferred embodiment, the impact absorber is Poron®, a porous, cellular urethane, material available from Rogers Corporation, PORON Materials Division, Box 158, East Woodstock, Conn. 06244.

A viscoelastic dampener pad 72 is attached between the base 32 and the flexure 28 and extends to the movable member 12. The dampener 72 damps vibration caused by the suspension arm impacting the movable member 12. This quickly damps out any vibration which might be caused by the head slam. This prevents the heads from bouncing back onto the disk surface thereby causing damage to the disk.

The impact absorber, or bumper, acts to decelerate the initial high G-force impact in as slow a manner as possible. The ideal impact bumper would be an infinitely thick and infinitely porous bumper (i.e, it compresses greatly with a small force applied). This not being possible in a product like a disk drive, the invention provides a very good compromise. The initial impact is decelerated slowly or softly by the porous Poron®, hence significantly reducing the peak or instantaneous deceleration seen by the arm at initial impact. The viscoelastically damped ramp flexure springs whose compression force deflection rate is greater, absorbs the remaining energy of the impact. This tandem approach creates a system which provides both the reduced instantaneous deceleration at initial impact of a softer bumper and the energy absorption capacity of a stiffer bumper.

The flexures 28, 30 of the head loading mechanism 10 provide a number of advantages over prior art head loading apparatus. The flexures 28, 30 provide the necessary rigidity to keep the moveable member 12 stationary as the suspension arms 52a–b, 54a–b move up the ramped surfaces 14a–b, 16a–b of the head load arms 14, 16, but yet are sufficiently flexible to allow the moveable member 12 to move into the retracted position without applying too great a force against the movement of the actuator arm 42. Additionally, while the flexures 28, 30 are compliant in the translational direction of the moveable member 12, they are stiff along their respective axes and are stiff and positionally stable in the z-axis. Another advantage of the head loading mechanism 10 of the present invention is that the flexures 28, 30 can be insert molded with the support base 32 and moveable member 12 to form a single, integral part. As a result, there is no play between the moveable member 12 and support base 32. Finally, the flexures 28, 30 impart a complex translational motion to the moveable member 12 that approximates a linear motion.

As the foregoing illustrates, the present invention is directed to a head loading mechanism in which the ramped surfaces of one or more head load arms move with the actuator arm of a radial arm actuator to facilitate loading/ unloading of magnetic heads onto the surfaces of a disk. It is understood that changes may be made to the embodiments described above without departing from the broad inventive concepts thereof. For example, while the moveable member 12 of the head loading mechanism 10 described herein has first and second head load arms 14, 16 to accommodate the dual disk design of the radial arm actuator 41, in disk drives that employ a radial arm actuator having only a single pair of suspension arms, the moveable member can have only a single head load arm with only one pair of ramped surfaces. Alternatively, the moveable member 12 can have more than two head load arms to accommodate disk cartridges containing more than two disks. Accordingly, the present invention is not limited to the particular embodiments disclosed, but is intended to cover all modifications that are within the spirit and scope of the invention as defined by the appended claims.

What is claimed is:

1. A head loading mechanism for a disk drive of the type having an actuator, said actuator having at least one suspension arm with a read/write head mounted on a distal end thereof, wherein said disk drive accepts a disk having a recording surface upon which information is written and read, said head loading mechanism comprising:

a support base fixedly mounted in said disk drive; and a moveable member movably attached to said support base via a pair of elongated flexures, said moveable member adapted to engage the distal end of said actuator, and said moveable member being operable to move upon said flexures in a plane parallel to the plane of the recording surface of the disk, wherein said at least one suspension arm engages and slides over an end of said moveable member in order to lift the read/write head toward, and away from, a surface of said disk.

2. The head loading mechanism recited in claim 1 wherein said flexures are spaced apart and extend from said support base to said moveable member substantially parallel to each other.

3. The head loading mechanism recited in claim 2 wherein said moveable member moves in a plane defined by said pair of flexures.

4. The head loading mechanism recited in claim 1 wherein each of said elongated flexures comprises a thin, planar member, the planar surface of each flexure lying substantially perpendicular to the direction of movement of said actuator.

5. The head loading mechanism recited in claim 1 wherein each of said flexures is compliant in a direction of movement of said actuator, but is rigid and positionally stable in a plane substantially perpendicular to the direction of movement of said actuator.

6. The head loading mechanism recited in claim 1 wherein the flexures are metallic, and wherein the moveable member and support base are formed of plastic.

7. The head loading mechanism recited in claim 6 wherein the metallic flexures are insert molded with the moveable member and support base to form a single, integral part.

8. The head loading mechanism recited in claim 1, wherein said moveable member has a detent positioned adjacent a ramped surface for temporarily capturing the distal end of the actuator and holding the distal end in place on the moveable member as the moveable member and actuator move in tandem toward, and away from, the edge of the disk.

9. The head loading mechanism recited in claim 1, further comprising means for stopping the movement of said moveable member toward the edge of said disk at a predetermined position proximate said disk so that the distal end of the actuator can move off a ramped surface of the moveable member as the actuator continues to move toward said disk, thereby loading said read/write head onto a surface of said disk.

10. The head loading mechanism recited in claim 1 wherein the distal end of said actuator comprises a flexible suspension arm on which the read/write head is mounted, and wherein the suspension arm of said actuator engages and slides over a ramped surface of said moveable member in order to lift the read/write head toward, and away from, a surface of said disk.

11. The head loading mechanism recited in claim 10 wherein said actuator has a pair of opposing suspension arms at its distal end that each carry a read/write head for reading and recording information on opposite sides of said disk, and wherein said moveable member has a corresponding pair of ramped surfaces for receiving the respective suspension arms in order to load and unload said read/write heads onto the respective surfaces of said disk.

12. The head loading mechanism recited in claim 1 further comprising means for adjusting a vertical position of said moveable member to ensure proper engagement of a ramped surface thereof with the distal end of the actuator.

13. The head loading mechanism recited in claim 12 wherein said actuator comprises a radial arm actuator.

14. The head loading mechanism recited in claim 1 wherein said moveable member has a ramped surface that engages the suspension arm of said actuator.

15. A head loading mechanism for a disk drive of the type having an actuator with a read/write head mounted on a distal end thereof, wherein said disk drive accepts a disk having a recording surface upon which information is written and read, said head loading mechanism comprising:
  a moveable member adapted to engage the distal end of said actuator;
  a support base fixedly mounted in said disk drive; and
  a pair of elongated flexures each coupled at one end to said moveable member and coupled at the other end to said support base, said moveable member being operable to move upon said flexures in a plane parallel to the plane of the recording surface of the disk,
  wherein the distal end of said actuator comprises a suspension arm on which the read/write head is mounted, and wherein said suspension arm engages and slides over an end of said moveable member in order to lift the read/write head toward, and away from, an end surface of said disk.

16. The head loading mechanism recited in claim 15 wherein said flexures are spaced apart and extend from said support base to said moveable member substantially parallel to each other.

17. The head loading mechanism recited in claim 15 wherein each of said elongated flexures comprises a thin, planar member, the planar surface of each flexure lying substantially perpendicular to the direction of movement of said actuator.

18. The head loading mechanism recited in claim 15 wherein each of said flexures is compliant in the direction of movement of said actuator, but is rigid and positionally stable in a plane substantially perpendicular to the direction of movement of said actuator.

19. The head loading mechanism recited in claim 15 wherein the flexures are metallic, and wherein the moveable member and support base are formed of plastic.

20. The head loading mechanism recited in claim 19 wherein the metallic flexures are insert molded with the moveable member and support base to form a single, integral part.

21. The head loading mechanism recited in claim 15 further comprising means for stopping the movement of said moveable member toward the edge of said disk at a predetermined position proximate said disk so that the distal end of the actuator can move off a ramped surface of the moveable member as the actuator continues to move toward said disk, thereby loading said read/write head onto a surface of said disk.

22. The head loading mechanism recited in claim 15 further comprising means for adjusting a vertical position of said moveable member to ensure proper engagement of a ramped surface thereof with the distal end of the actuator.

23. The head loading mechanism recited in claim 15 wherein said actuator comprises a radial arm actuator.

24. The head loading mechanism recited in claim 15 wherein said moveable member has a ramped surface that engages the suspension arm of said actuator.

25. A disk drive apparatus for receiving a removable disk cartridge containing a rotatable information storage disk having a recording surface upon which information is written and read, said disk drive apparatus comprising:
  an actuator having at least one suspension arm upon which a read/write head is mounted, said actuator being movably mounted within said disk drive apparatus for movement toward and away from an edge of said disk;
  a support base fixedly mounted in said disk drive apparatus; and
  a moveable member movably attached to said support base via a pair of elongated flexures, said moveable member adapted to engage a distal end of said actuator, and said moveable member moving upon said flexures in a plane parallel to the plane of the recording surface of the disk,
  wherein an end of said moveable member slidably engages a respective suspension arm in order to load and unload said read/write heads onto, and off, said recording surface of said disk.

26. The disk drive apparatus recited in claim 25 wherein said flexures are spaced apart and extend from said support base to said moveable member substantially parallel to each other.

27. The disk drive apparatus recited in claim 25 wherein said moveable member moves in a plane defined by said pair of flexures.

28. The disk drive apparatus recited in claim 25 wherein each of said elongated flexures comprises a thin, planar member, the planar surface of each flexure lying substantially perpendicular to the direction of movement of said actuator.

29. The disk drive apparatus recited in claim 25 wherein each of said pair of flexures is compliant in a direction of movement of said actuator, but is rigid and positionally stable in a plane substantially perpendicular to the direction of movement of said actuator.

30. The disk drive apparatus recited in claim 25 further comprising means for adjusting a vertical position of said moveable member to ensure proper engagement of a ramped surface thereof with the suspension arm of the actuator.

31. The disk drive apparatus recited in claim 25 wherein the flexures are metallic, and wherein the moveable member and support base are formed of plastic.

32. The disk drive apparatus recited in claim 31 wherein the metallic flexures are insert molded with the moveable member and support base to form a single, integral part.

33. The disk drive apparatus recited in claim 25, wherein said moveable member has a detent positioned adjacent a ramped surface for temporarily capturing the suspension arm of the actuator and holding the suspension arm in place on the moveable member as the moveable member and suspension arm move in tandem toward, and away from, the edge of the disk.

34. The disk drive apparatus recited in claim 25, further comprising means for stopping the movement of said moveable member toward the edge of said disk at a predetermined position proximate said disk so that the suspension arm of the actuator can move off a ramped surface of the moveable member as the actuator continues to move toward said disk, thereby loading said read/write head onto a surface of said disk.

35. The disk drive apparatus recited in claim 25 wherein said actuator has a pair of opposing suspension arms at its distal end that each carry a read/write head for reading and recording information on opposite sides of said disk, and wherein said moveable member has a corresponding pair of ramped surfaces for receiving the respective suspension arms in order load and unload said read/write heads onto the respective surfaces of said disk.

36. The disk drive apparatus recited in claim 25 wherein said actuator comprises a radial arm actuator.

37. The disk drive apparatus recited in claim 25 further comprising:

impact absorbing means on said moveable member for absorbing energy when said suspension arm impacts said moveable member.

38. The disk drive apparatus recited in claim 37 wherein said moveable member has an engagement surface that engages with a corresponding engagement surface on said actuator, said impact absorbing means being positioned on said engagement surface of said moveable member.

39. The disk drive apparatus recited in claim 38 wherein said impact absorbing means is a cellular urethane impact absorbing pad positioned on the engagement surface of said moveable member.

40. The disk drive apparatus apparatus recited in claim 37 further comprising:

a viscoelastic dampener pad attached to said support base and to at least one of said elongated flexures for damping vibration caused by said suspension arm impacting said moveable member.

41. The disk drive apparatus recited in claim 40 wherein said pad extends to said moveable member.

42. The disk drive apparatus recited in claim 25 wherein said moveable member has a ramped surface that engages the suspension arm of said actuator.

\* \* \* \* \*

UNITED STATES PATENT AND TRADEMARK OFFICE
CERTIFICATE OF CORRECTION

PATENT NO. : 5,831,795
DATED : November 3, 1998
INVENTOR(S) : Yiping Ma, Edward L. Rich, Fred C. Thomas, III, David W. Griffith It is certified that error appears in the above-identified patent and that said Letters Patent is hereby correcte Col. 7, line 21, delete "4b," at the end of the line.

Signed and Sealed this

Sixth Day of April, 1999

Attest:

Q. TODD DICKINSON

Attesting Officer

Acting Commissioner of Patents and Trademarks